United States Patent Office 3,600,202
Patented Aug. 17, 1971

3,600,202
MOLDABLE WAX COMPOSITIONS
David M. MacLeod, Sarnia, Ontario, Canada, assignor to Esso Research and Engineering Company
No Drawing. Filed Oct. 11, 1968, Ser. No. 766,993
Int. Cl. B28b 7/28; C08h 9/00; C09d 11/00
U.S. Cl. 106—20                                   7 Claims

ABSTRACT OF THE DISCLOSURE

Moldable high strength petroleum wax compositions are prepared involving the use of a major amount of (A) a refined paraffin wax having a melting point of between about 145° and about 155° F., (B) a small amount of a microcrystalline wax having a melting point of between about 170° and about 200° F. and a needle penetration of between about 4 and about 12 mm./10, measured at 77° F., and (C) a small amount of a soft intermediate wax having a melting point of between about 125° and about 140° F. and a needle penetration of between about 18 and about 30 mm./10, measured at 77° F., the blended wax composition having a cloud point of between about 152 and about 163° F. Inert fillers, pigments, dyes and the like, in minor amounts, may be blended with the three component wax compositions for various specific uses.

DESCRIPTION OF THE INVENTION

The present invention relates to a novel and improved wax composition which exhibits high strength characteristics against breakage and when molded, within comparative wide variations in molding temperatures, is still readily released from the molds by cooling. Molded wax objects such as candles, novelty items, crayons and the like require a high strength, i.e., a certain degree of resistance to breakage and cracking, and at the same time, in order to accurately mold or cast such wax objects it is necessary that the cooled materials, upon solidification in the mold, be readily released therefrom without distortion of the form and configuration. The ease of release from molds, it has been found, is increased if the wax compositions contain a limited percentage of microcrystalline waxes of relatively high melting point but by the use of such types of waxes, oftentimes difficulties are encountered because of unduly high breaking which renders the cast objects generally useless. On the other hand, the break strength is improved if intermediate waxes of relatively low melting point are employed but when these are used in undesirably high amounts, difficulty in release of the cast compositions from molds is encountered. Additionally, in the case of wax compositions that are of suitable high break strength but which are designed for use in manufacturing crayons, certain percentages of the high melting point microcrystalline waxes are required, but this renders the crayons relatively useless because it is difficult to write or draw with such crayons. In other words, the application of a film of the crayon materials on paper is rendered difficult both from the standpoint of the amount placed upon the paper using ordinary hand pressure, as in writing, and, additionally, the uniformity of the film is undesirably erratic and unsatisfactory. Uniformity of the adhesion of the film formed by applying hand pressure to paper with the crayon is an important property which is largely controlled by a proper selection of a wax or a blend of waxes. Similarly, solid molded wax compositions which are to be carved or shaped by means of sculpturing tools must have suitable properties as to the ease of release from the molds upon cooling and must have a sufficiently high resistance to breaking by forces applied to the cast material as well as to be workable with some degree of precision and ease by means of the aforementioned cutting and working tools.

It has now, unexpectedly, been found that a unique combination of hard microcrystalline wax and soft intermediate wax added to a predominantly medium melting point paraffin wax permits the final blended compositions to exhibit an ease of release from molds, a high resistance to breaking and at the same time, especially in the case of crayon wax compositions, giving a uniformity of film thickness, ease of writeability, and definition, as to the character of the film as applied to paper and its adhesion to that paper. This is brought about by a unique combination of hard microcrystalline and soft intermediate waxes, both added in minor amounts to a refined paraffin wax of medium melting point.

In a large measure, this unique combination is achieved because of the mutual solubility of the three components in one another. The molecules of the high melting point wax, although it is composed of very small crystals, are too large to enter interchangeably into the larger crystals of the refined paraffin wax. In other words, the components do not form a solid solution; however, if a minor amount of a relatively soft melting point intermediate wax is added, a perfect blending of the three components occurs so that when the liquid wax is poured into the mold and cooled, solidification occurs significantly earlier, particularly in the cases where the wax blend has a relatively high cloud point. Further cooling from the solidification point to the demolding temperature then causes a sufficient contraction of the wax so that it perceptibly pulls the wax inward and away from the walls of the mold. Where the wax blend is devoid of the high melting point microcrystalline wax component, the solidification will not occur until a temperature, close to the melting point of the blend, is reached. Such a wax cools further as a liquid, allowing more settling in the mold and gives a denser solidified wax blend. Also, what contraction does take place, does so over a narrower temperature range and the amount of the contraction is therefore less, so that the solidified wax blend remains closer to the mold walls and is more difficult to release from the mold. It is believed that the improved strength, when employing the high melting point microcrystalline wax, actually is due to an eutectic formation which reduces the crystallinity and improves the uniformity of the crystals. Thus, weak points originating as cracks adjacent large crystals are minimized or entirely eliminated. The action of the soft low melting intermediate wax depends on incomplete solubility in the bulk of the medium melting point paraffin wax. The softest and lowest melting point components of this low melting point wax are non-normal paraffins which are believed to be incapable of freely entering into the other wax crystals because of their particular shape. These compounds, however, it is believed, do act as a lubricating film for the other wax crystals and thus enable the solidified wax blend, especially in the case of crayons, to form an even continuously uniform film of the material on paper when placed against paper under the ordinary pressures of the hand.

This low melting point wax also reduces any tendency for the molded material to crumble or break into small pieces except under rather severe applications of force. Again, it was discovered that this improved laying down of a uniformly clearly defined film when the composition is applied to paper was unexpected even though the low melting point intermediate wax does impart this character to the crayon. This was because the presence of the high melting point microcrystalline wax would be expected to work against this property but it was not found to be the case. The combination of the low melting point intermediate wax and the high melting point microcrystalline wax preserved both beneficial effects, i.e., the ease of release from the mold imparted by the high melting point wax and the uniformly continuous film on paper attributable to the use of the low melting point wax. Neither of these properties was impaired by the presence of the small amount of each of these types of waxes. In other words, the high melting point microcrystalline wax by its presence in the composition preserved its properties of imparting ease of release from the mold and did not impair the writeability property of the low melting point wax; the presence of the low melting point intermediate wax preserved the properties of uniformity of film application and definition and did not impair the improved mold release property.

The three types of waxes employed in forming the wax composition blends are as follows:

(1) Wax A which forms the major component of the high break strength molding wax composition is a fully refined normal commercial quality of paraffin wax having a melting point between about 145° and about 155° F., an oil content below 0.5%, a needle penetration value of between about 10 and 15 mm./10, measured at 77° F., and a viscosity of between about 40 and about 50 SUS, measured at 210° F. This wax is commercially recovered by commercial processes long known to the industry involving solvent recrystallization from petroleum distillate fractions boiling at between about 800° and about 1000° F., at a temperature of between about 70° and 90° F.

(2) Wax B is the second component of the three component blend and is a hard microcrystalline wax having a melting point between about 170° and about 200° F., preferably between about 180° and about 190° F., and an oil content below 2%, a needle penetration of between about 4 and about 12 mm./10, measured at 77° F., and a viscosity of about 60 to 80 SUS, measured at 210° F. This type of wax is obtained from heavy distillate lubricating oils or residual lubricating oils of waxy nature by precipitation from conventional solvent solutions. The desired wax fraction is filtered off as a solid at temperatures of about 90° to 110° F. at which temperatures the undesired lower melting point waxes and the oil remain dissolved.

(3) Wax C, the third and final wax component of the moldable wax composition is a low melting point intermediate wax having a melting point between about 125° and about 140° F., an oil content below about 1.0%, a needle penetration between about 18 and about 30 mm./10, measured at 77° F. and a viscosity of between about 60 and about 65 SUS, measured at 210° F. This wax is obtained from a petroleum distillate, boiling at 700° to 1100° F., by conventional solvent recrystallization which is carried out at a temperature of from 0° to 45° F. At this low crystallization temperature, essentially all of the wax is precipitated from solutions including the very soft, very low melting point components.

The term "intermediate" is used to designate a wax which has properties intermediate between those of paraffin and microcrystalline waxes. While the paraffin wax is composed predominantly of straight chain or normal paraffins which readily form large crystals, and the microcrystalline wax is mostly composed of branched or non-normal molecules which form only small crystals, the intermediate wax is of mixed or average composition. The crystallinity and other properties of the intermediate wax lie between those of the paraffin and microcrystalline types.

Specifically and preferably, Wax A has a melting point of about 150° F. Wax B has a melting point between about 180° and about 190° F. and Wax C has a melting point between about 127° and about 137° F. The amount of Wax A employed, based on the weight of the total wax blended composition, ranges between about 82 and about 97 wt. percent, Wax B between 2 and about 8 wt. percent and Wax C between about 1 and about 10 wt. percent.

As used in this description and accompanying claims, the melting point of the waxes was determined by ASTM Method D-87-66 for the paraffin wax, and by ASTM Method D-127-63 for the microcrystalline and intermediate waxes. The oil content was determined by ASTM Method D-721-65T, the needle penetration by ASTM Method D-1321-65 and the viscosity by ASTM Methods D-445-65 and D-2161-66. The cloud point temperatures of the blended wax composition were determined by the following method:

A sample of molten wax above its cloud point was put in a test tube and allowed to cool in air, while being continuously stirred with a thermometer. The cloud point was taken as the highest temperature at which a distinct amount of solid precipitate could be seen.

It is not necessary that these three types of waxes above described be combined in the precise ranges of amounts as stated in wt. percent so long as the final wax blend has a cloud point temperature ranging between about 152 and about 163° F., preferably between about 153 and about 160° F., and so long as the three components are present. The blended wax compositions consist only of these three wax components and have a cloud point temperature falling within the above-stated temperature limits for cloud point. The wax blend is satisfactory for the casting of objects having the heretofore improved properties. Wax compositions possessing the designated cloud point temperatures find suitable uses as bases for cast objects such as children's toys, blocks for sculpturing, crayons and the like.

Various fillers such as finely divided calcium carbonate, whiting, stearic acid, or other finely divided powders may be employed so long as they are not abrasive and so long as they are uniformly distributed at the time the hot melt blend is prepared. In the case of crayons, stearic acid is a commonly employed filling material which serves as a pigment as well as for white crayons. Obviously, various pigments may be employed in making up crayons; these pigments being used for tinting and color effects in amounts ranging from ½ up to 2% of the total final composition. Small amounts of carbon black may be employed both from the standpoint of structural strength improvement and from the standpoint of serving as a coloring material. For specialized properties finely divided silica may be employed as a filler material but is generally not employed, as the use to which the final cast or molded material is to be put is not served through the abrasive action of such material. The amount of filler or pigment employed may vary over wide ranges. In the case of crayons, the amount of stearic acid employed will vary desirably from about 30 to about 40% of the final composition, the balance being the heretofore described three component wax mixture with or without a further pigment or coloring material being used. In the following molded compositions, the composition actually tested consisted of 70% of the wax blend and 30% of stearic acid.

The break strength test hereinafter described in Table I was carried out as follows: 70 wt. percent of the wax or wax blend being tested was admixed with 30 wt. percent of stearic acid. This composition was then heated to a temperature of 180° F. and stirred, after which the composition was poured into molds which were maintained at room temperature. The molds were of such size and shape that the molded wax rods formed were about 4" in length and 5/16" in diameter. The material poured into the molds was held at room temperature for about 30 seconds and thereafter the mold was placed in a water bath at a temperature of 76°–88° F. for about 15 minutes, after which the molds were removed from the water bath and the wax rods removed therefrom.

The molds consisted of two sections, a bottom section 3½" high having a 5/16" inside diameter and a 10/16" outside diameter; a top section 2" high having a 9/16" inside diameter and a 10/16" outside diameter. The two sections were overlapped so that the top section fitted over ¼" of the bottom section.

The break strength was then determined by placing the 4" rod across two rigid supports approximately 4" apart. In the center of the rod an insulated wire was placed which hung down and was used to suspend a container into which water was poured. When a sufficient amount of water had been slowly poured into the container to cause the wire to which it was suspended to break the wax rod, the container and its water content were weighed in pounds. This is recorded in the following table as the break strength in pounds. The ease of mold release was observed by the operator both from a visual and from a manual standpoint and was judged on the basis of poor, fair, good and very good. Likewise, writeability was judged by the operator by writing on paper with the rods and visually observing the ease of inducing a film on the paper, judging also the uniformity of the film and its definition. Again, the ratings were on the basis of poor, fair, good and very good.

microcrystalline petroleum wax having a melting point of between about 170° and about 200° F., an oil content below 2%, a needle penetration value of between about 4 and about 12 mm./10, measured at 77° F., and a viscosity of about 60 to 80 SUS at 210° F.; and (c) from about 1 to 10 wt. percent of a petroleum wax having a melting point between about 125° and about 140° F., an oil content below about 1%, a needle penetration between about 18 and 30 mm./10, measured at 77° F., and a viscosity of between about 60 and 65 SUS measured at 210° F.;

the resultant blended wax composition having a cloud point of between 152° and about 163° F.

TABLE I

| Example | Wax A,[1] wt. percent | Wax B,[2] wt. percent | Wax C,[3] wt. percent | Cloud point, °F. | Mold release | Writeability | Break strength, lbs |
|---|---|---|---|---|---|---|---|
| 1 | 100 | 0 | 0 | 150 | Fair | Fair | 2.2 |
| 2 | 95 | 5 | 0 | 158 | Good | do | 2.4 |
| 3 | 90 | 10 | 0 | 165 | Very good | Poor | 2.5 |
| 4 | 95 | 0 | 5 | 150 | Fair | Good | 2.2 |
| 5 | 85 | 0 | 15 | 150 | Poor | Very good | 2.0 |
| 6 | 85 | 5 | 10 | 157 | Very good | do | 2.4 |
| 7 | 95 | 4 | 1 | 155 | do | Fair | 2.4 |
| 8 | 94 | 4 | 2 | 154 | do | Very good | 2.3 |
| 9 | 90 | 5 | 5 | 158 | Good | do | 2.4 |
| 10 | 85 | 5 | 10 | 157 | Poor | do | 2.1 |

[1] Wax A had a melting point of 150° F.
[2] Wax B had a melting point of 182° F.
[3] Wax C had a melting point of 127° F. for Examples 1 through 6 and a melting point of 137° F. for Examples 7 through 10.

From the data set forth in Table I it is at once apparent that Examples 6 and 8 exhibit the very best results. There is no loss of break strength while at the same time the writeability and demolding characteristics are very good. Example 5 shows that the omission of Wax B and the use of 15% of Wax C results in good writeability character for the composition but a poor mold release character; also, the break strength is reduced to the absence of Wax B. The same is also true in the case of Example 4 where no Wax B was employed and only 5% of Wax C was used. On the other hand, Examples 2 and 3 show that less than desirable writeability characteristics are present in compositions containing no Wax C and although good break strength is apparent, and the mold release character either good or very good, the final composition is unsatisfactory because of the absence of good writeability. Examples 7 through 10, inclusive, refer to the use of Wax C of 137° F. melting point in mixtures containing 4 to 5% of Wax B. For good results it was necessary to use 2 to 5% of Wax C. Too low an amount of Wax C resulted in only fair writeability, while too much of Wax C resulted in poor mold release.

The present invention having been fully described and illustrated, what is desired to be secured by Letters Patent is:

1. A petroleum wax composition of improved molding and high break strength properties comprising:
   (a) from about 82 to about 97 wt. percent of a refined paraffin wax having a melting point of between about 145° and about 155° F., an oil content below 0.5%, a needle penetration value of between about 10 and 15 mm./10, measured at 77° F., and a viscosity of between about 40 and about 50 SUS at 210° F.;
   (b) between about 2 and about 8 wt. percent of a 2. A wax composition as defined by claim 1 wherein the cloud point of the blend is between about 153° and about 160° F.

3. A wax composition as in claim 1 wherein Wax A has a melting point of about 150° F., Wax B, a melting point of about 182° F. and Wax C, a melting point of about 137° F.

4. A wax composition as in claim 1 wherein the wt. percent of Wax A is about 94, of Wax B, about 4 and of Wax C, about 2.

5. A wax composition as defined by claim 1 wherein Wax A has a melting point of about 150° F., Wax B has a melting point between about 180° and about 190° F., and Wax C has a melting point between about 127° and about 137° F.

6. A wax composition comprising a uniform admixture of the wax blend of claim 1 in the amount of between about 60 and about 70 wt. percent and stearic acid in the amount of between about 30 and about 40 wt. percent.

7. A crayon wax composition comprising the composition of claim 6 and containing a pigment.

References Cited

UNITED STATES PATENTS 3,060,045 11/1962 Malakoff et al. _____ 106—270
3,400,092 9/1968 Fox _____ 106—270X
3,491,043 1/1970 Zmitrovis _____ 106—19X JULIUS FROME, Primary Examiner J. B. EVANS, Assistant Examiner US. Cl. X.R.

106—38.8, 270, 271, 285; 208—21; 260—28.5